United States Patent Office 3,340,333
Patented Sept. 5, 1967

3,340,333
PREPARATION OF PHOSPHORUS COMPOUNDS CONTAINING A PHOSPHORYL GROUP
Charles F. Baranauckas, Niagara Falls, and Arlen W. Frank, Grand Island, N.Y., assignors to Hooker Chemical Corporation, Niagara Falls, N.Y., a corporation of New York
No Drawing. Filed July 1, 1963, Ser. No. 292,148
11 Claims. (Cl. 260—985)

This invention relates to the preparation of phosphorus compounds containing a phosphoryl group. More particularly, it relates to the preparation of phosphine oxides and esters of phosphinic, phosphonic and phosphoric acids utilizing halogenating agents.

It has been found that phosphine oxides and esters of phosphinic, phosphonic and phosphoric acids may be prepared readily and in high purity by utilization of a halogenating agent. In accordance with this improved process, by halogenating a substance selected from the group consisting of phosphorus and a phosphorus-containing compound of the general formula:

$$P(R)_3$$

wherein R is selected from the group consisting of halogen, hydrocarbon of about 1 to 32 carbon atoms, substituted hydrocarbon of about 1 to 32 carbon atoms, and —OR' where R' is selected from the group consisting of hydrogen, alkyl and aralkyl radicals of about 1 to 32 carbon atoms, in the presence of an organic alkanolic compound, a phosphorus compound containing a phosphoryl group is readily formed. A phosphoryl group is that indicated by $$P \rightarrow O$$

bond.

The phosphorus-containing compound may also be represented as of the formula: $(R^3)_{n'}P(OR^2)_{n^2}$, in which formula $R^3$ is selected from the group consisting of chlorine, bromine, iodine, alkyl and phenylalkyl, $R^2$ is selected from the group consisting of hydrogen, alkyl and phenylalkyl, $n'$ is an integer from 0 to 3 inclusive, and $n^2$ is an integer from 0 to 3 inclusive, providing that the sum of $n'$ and $n^2$ is 3, said reacting being sufficient to produce a product comprising a phosphorus compound containing a phosphoryl group.

The process of this invention may be carried out by contacting phosphorus or phosphorus containing compound with an organic alkanolic compound and halogenating the resultant solution, mixture, emulsion or slurry. The halogenation may be carried out by known techniques, such as by bubbling halogen gas through a solution or slurry, or by adding a halogenating agent to the mixture. Still another and preferred method for conducting the process of this invention is to add to the alcohol separately or concomitantly the halogenating agent and the phosporus or phosphorus-containing compound.

The present invention makes possible the preparation of triesters of phosphoric acid by halogenating a mixture, slurry or solution of a triester of phosphorus acid and alcohol. The equation for this reaction is thought to be:

(1) 

$$(R'O)_3P + X_2 + R'OH \longrightarrow (R'O)_3P + R'X + HX$$

where R' is an alkyl or alkaryl radical of about 1 to 32 carbon atoms, and X is a halogen. The triester of phosphoric acid is recovered in high yields and in good purity, which is surprising in view of the fact that halogens are known to react with alcohols. Although this Equation 1 appears to explain satisfactorily the general procedure of the present invention, neither it nor any of the following suggested reaction mechanisms is to be interpreted as limiting the invention.

The triester of a phosphoric acid may also be prepared by halogenating a phosphorus trihalide in the presence of an alcohol. This reaction may be represented by the following general equation:

(2) 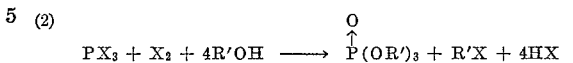

$$PX_3 + X_2 + 4R'OH \longrightarrow \overset{O}{\underset{\uparrow}{P}}(OR')_3 + R'X + 4HX$$

wherein R' and X are as defined above. This reaction may be carried out by the preferred procedure indicated above, under conditions which will be set forth hereinafter. It also has been found that by halogenating a diester of phosphorous acid, in the presence of an alcohol, a triester of phosphoric acid is obtained. This reaction may be illustrated:

(3) 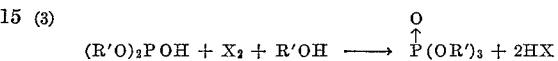

$$(R'O)_2POH + X_2 + R'OH \longrightarrow \overset{O}{\underset{\uparrow}{P}}(OR')_3 + 2HX$$

wherein R' and X are as defined above. It is to be understood that in addition to the above, intermediates which are mono- and di-halo phosphites, such as dichloroalkyl phosphite, dibromo alkyl phosphite, dichloro arylalkyl phosphite, dibromo arylalkyl phosphite, dialkyl halophosphite and diarylalkyl halo phosphite may be utilized in the practice of this invention.

It has been further found that when elemental phosphorus, in contact with an alcohol, is halogenated, a triester of phosphoric acid is obtained. The reaction may generally be shown as:

(4) 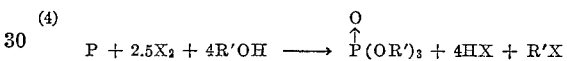

$$P + 2.5X_2 + 4R'OH \longrightarrow \overset{O}{\underset{\uparrow}{P}}(OR')_3 + 4HX + R'X$$

wherein R' and X are as defined above.

It also has been discovered that other esters may be prepared by the novel halogenation-alcoholysis process of this invention. Esters of phosphonic acid may be obtained by conducting the process of this invention with esters of phosphonous acids. Esters of phosphinic acid may be prepared by utilizing esters of phosphinous acid in the practice of this invention. The two above reactions may be respectively illustrated by the following general equations:

(5) 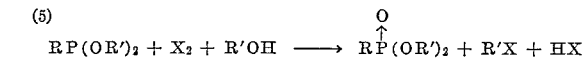

$$RP(OR')_2 + X_2 + R'OH \longrightarrow R\overset{O}{\underset{\uparrow}{P}}(OR')_2 + R'X + HX$$

(6) 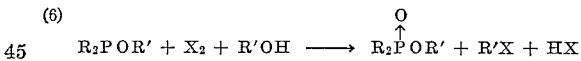

$$R_2POR' + X_2 + R'OH \longrightarrow R_2\overset{O}{\underset{\uparrow}{P}}OR' + R'X + HX$$

wherein R, R' and X are as defined above. In addition, tertiary phosphines may be readily oxidized to phosphine oxides by following this invention.

(7) 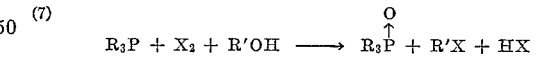

$$R_3P + X_2 + R'OH \longrightarrow R_3\overset{O}{\underset{\uparrow}{P}} + R'X + HX$$

The organic alkanolic compound of this invention is one which contains at least one C—OH group. It may be a saturated, unsaturated, substituted or unsubstituted compound. It is preferred, however, to utilize primary alcohols. The radical of the alcohol need not be the same as that of the ester or hydrocarbon of the phosphorus-containing compound, although in the preferred embodiment such similarity is preferred. It is desirable in the practice of this invention to utilize a molar ratio of alcohol to the desired phosphorus-containing compound of about 15:1. However, good results may be achieved utilizing a ratio of 30:1 and ratios as high as 100:1 and as low as 1:1 may be employed. At ratios of about 1:1, the sodium salt of an alcohol or other HCl acceptors such as ammonia, amines, e.g., tertiary amines and so forth, will usually be employed to facilitate the isolation of the product. Examples of alcohols which may be utilized in this invention are methanol, ethanol, butanol, isobutyl alcohol, benzyl alcohol, propylene glycol, ethylene glycol, HET® Diol, also called chlorendic diol, neopentyl alcohol, stearyl alcohol, 2-phenylethanol, n-eicosanol and 2-chloroethanol.

The organic radicals of the phosphorus-containing compounds utilized in the practice of this invention may have about 1 to 32 carbon atoms, but in the invention, as usually practiced, each or all the radicals have between 1 to 22 carbon atoms, with the prefered number of carbon atoms per radical being about 1 to 10. Typical examples of phosphorus-containing compounds which may be utilized in the invention include:

triethyl phosphite, tributyl phosphite,
triisobutyl phosphite, tripentyl phosphite,
trihexyl phosphite, tri-(2-ethylhexyl)phosphite,
triisooctyl phosphite, tridecyl phosphite,
tridodecyl phosphite, diethyl butyl phosphite,
tri-(3-acetoxypropyl)phosphite, dibutyl butyl phosphonite,
trioctadecenyl phosphite, dipropenyl butyl phosphite,
2-phenylethyl dihexyl phosphite,
tri-(8-hydroxyoctyl)phosphite,
tri-(2-ethoxyethyl)phosphite,
4-phenoxybutyl dibutyl phosphite,
tri-(2-phenoxyethyl)phosphite,
tri-(2-carboxyethyl)phosphite,
tri-(3-acetoxypropyl)phosphite, dibutyl butyl phosphonite;
dibutyl phenylphosphonite, tridodecyl phosphonite,
didodecyl phenylphosphonite,
dihexylpropenylphosphonite, tripropenylphosphonite,
tri-(2-methylpropenyl)phosphonite,
tri-(2-hydroxyethyl)phosphonite,
di-(2-methoxyethyl)phenylphosphonite,
dihexyl 2-ethoxyphenylphosphonite,
tri-(6-carbethoxyhexyl)phosphonite,
di-(4-acetoxybutyl)phenyl phosphonite,
triethyl phosphinite, trihexylphosphinite,
tridodecyl phosphinite, butyl dipropenylphosphinite,
butyl diphenylphosphinite, tripropenyl phosphinite,
2-methylpropenyl diphenylphosphinite,
tri-(2-hydroxyethyl)phosphinite,
6-methoxyhexyl diphenylphosphinite,
tri-(2-carbethoxyethyl)phosphonite,
4-acetoxybutyl dipropenylphosphinite, tributyl phosphine,
trihexyl phosphine, tridodecyl phosphine,
diethyl butyl phosphine, tripropenyl phosphine,
tri-(2-methylpropenyl)phosphine, trihexenyl phosphine;
trioctadecenyl phosphine, dipropenyl butyl phosphine,
triphenyl phosphine, tri-(2,4-dimethylphenyl)phosphine,
tri-(2-phenylethyl)phosphine, diphenyl hexyl phosphine,
dipropenylphenyl phosphine,
tri-(6-hydroxyhexyl)phosphine;
tri-(2-methoxyethyl)phosphine,
tri-(3-methoxyphenyl)phosphine,
tri-(2-carboxyethyl)phosphine,
tri-(2-acetoxypropyl)phosphine,
4-phenoxyphenyl dimethyl phosphine,
4-methoxyphenyl dipropenyl phosphine,
2-ethyl-1,3,2-dioxaphospholane,
2-propenyl-1,3,2-dioxaphospholane,
2-decyl-1,3,2-dioxaphospholane,
2-(2-hydroxyethyl)-1,3,2-dioxaphospholane,
2-(2-methoxyethyl)-5-acetoxy-1,3,2-dioxaphospholane,
2-hexyl-4,5-diethyl-1,3,2-dioxaphospholane,
2-dodecyl-4-phenylethyl-1,3,2-dioxaphospholane,
2-methoxy-5-ethyl-4-propyl-1,3,2-dioxaphosphorinane, and
2-methyl-4-methoxymethyl-1,3,2-dioxaphosphorinane.

The desired product is recovered by known procedures such as distillation, treatment with an acid acceptor, filtration, crystallization, decantation and so forth.

As set forth above, one of the processes in carrying out the invention involves the utilization of elemental phosphorus. When elemental phosphorus is employed, it is desirable to dilute with nitrogen or other inert gas, the halogen which is passed through or is brought into contact with the elemental phosphorus-alcohol solution. The ratio of halogen to nitrogen in such processes is preferably from about 3:2 to 2:3, but ratios of from 10:1 and 1:10 are also utilized depending on the conditions of the reaction.

The temperatures at which the invented processes are effected will generally be governed by the extent of side reactions between the end product, HCl, and the phosphorus-containing compounds and by reaction rate considerations. It has been found that the reaction may be conducted satisfactorily at temperatures between about 30 degrees centigrade below zero and 80 degrees centigrade above zero. However, the preferred temperatures are in the range of about 0 to 50 degrees centigrade, with the preferred temperature range being from between about 0 degree centigrade and 50 degrees centigrade. It has also been found that the reaction may be conducted under atmospheric, sub-atmospheric or super-atmospheric pressures.

Although it is preferred to utilize an elemental halogen in the process of this invention, other halogenating agents such as sulfuryl chloride, thionyl chloride, N-chlorosuccinimide, N,N-dichlorophenyl sulfonamide and cupric chloride, are also effective and may be used instead.

The rate of flow of the halogenating agent into a mixture of alcohol and phosphorus or phosphorus-containing compound should preferably be at such a rate so as not to allow the exothermic reaction which occurs to increase the temperature at which the process is being carried out by more than about 20 degrees centigrade and it is preferable to add the halogenating agent in such manner and condition that the temperature rise is not more than about 5 degrees centigrade. When the halogenating agent and the phosphorus-containing compound are added directly to the alcohol, they should be added at such a rate that neither one is in substantial excess with respect to each other. An excess amount of the halogenating agent over the calculated stoichiometric amount may be utilized. An excess of halogenating agent, about 0.5 to 200 percent, results in a satisfactory reaction. However, an excess of between 10 and 100 percent may be suitably employed in the reaction, with the preferred amount of excess halogenating agent utilized being between about 1 and 50 percent.

The following examples will illustrate the invention further, but are not intended to be limiting. All parts are by weight and all temperatures are in degrees centigrade, unless otherwise stated.

*Example 1*

This example illustrates the preparation of a trialkyl phosphate from a trialkyl phosphite by the direct addition of a halogen to a solution of the trialkyl phosphite in an alcohol.

At a temperature of 0–10 degrees centigrade, chlorine was passed into a solution of 24.8 parts of trimethyl phosphite in 192 parts of methanol, at such a rate that the temperature maintained by external cooling did not exceed 10 degrees centigrade. The addition was stopped after about 65 minutes when the reaction was ended, as indicated by a permanent chlorine color or a negative test for unreacted phosphite or both. The solution was allowed to warm to room temperature and was then stripped on a steam bath under water pump vacuum (about 25 mm. mercury absolute). The residue, 25.6 parts, $n_d^{23}$ 1.4043, was found to contain no dimethyl phosphite or trimethyl phosphite. Distillation gave 14.6 parts (52% yield) of trimethyl phosphate, boiling point 76–88 degrees centigrade/10 mm. Hg, which was shown by infrared analysis to contain some dimethyl methylphosphonate.

Another preparation of trimethyl phosphate by similar method steps, resulted in a 56% yield of product, of which 82% was trimethyle phosphate and 18% dimethyl methylphosphonate, as determined by gas chromatographic analysis.

Example 2

Tripropyl phosphate was prepared in 96% yield from tripropyl phosphite, chlorine and propanol following the procedure set forth in Example 1 utilizing 666 parts of tripropyl phosphite and about 5,400 parts of propanol. The product had an acid number of 0.33. Analysis showed—

Calculated for $C_9H_{21}O_4P$: P, 13.8. Found: P, 13.4.

Examples 3–6

The effect of reducing the ratio of alcohol to phosphite in the preparation of trimethyl phosphate in accordance with the method of Example 1 is illustrated in Table I. Example 1 was followed in each instance except that the molar ratio of reactants was varied and the reaction temperature was maintained between 25 degrees centigrade and 35 degrees centigrade.

TABLE I

| Moles Methanol per Mole $(CH_3O)_3P$ | Percent Impurities in Product | |
|---|---|---|
| | $(CH_3O)_3P$ | $(CH_3O)_2PHO$ |
| 30 | Nil | 0.2 |
| 15 | Nil | 0.3 |
| 5 | Nil | 7.3 |
| 1 | 0.9 | 19.3 |

These data indcate that an excess of alcohol is preferred in the operation of this invention. However, when utilizing a lower reaction temperature or alkyl groups other than the sensitive methyl group only a slight excess of alcohol may be sufficient to keep byproducts to a minimum.

Example 7

A 0.25 molar solution of iodine in methanol was added to a solution of 26.8 parts of trimethyl phosphite in 80 parts of methanol at 0–10 degrees centigrade for about two and a half hours until the iodine was no longer decolorized. The solution was stripped under vacuum on a steam bath, giving 25.1 parts of crude residue which was shown by analysis to contain 1.1 percent trimethyl phosphite and 35.9 percent dimethyl phosphite. This residue was distilled, giving 19.5 parts of product, boiling point 44–50 degrees centigrade/1 mm. Hg, $n_d^{23}$ 1.3987, whose infrared spectrum showed that it was a mixture of dimethyl phosphite and trimethyl phosphate.

Example 8

Bromine was added dropwise to a solution of 24.8 parts of trimethyl phosphite in 192 parts of methanol at 0–10 degrees centigrade for about 20 minutes until the bromine was no longer decolorized. The solution was allowed to warm to room temperature and was then stripped on a steam bath under water pump vacuum, giving 27.0 parts of residue, $n_d^{23}$ 1.4009, which was shown by analysis to contain no trimethyl phosphite and 4.0 percent dimethyl phosphite. Distillation of this product gave 15.3 parts of trimethyl phosphate containing dimethyl phosphite. The dimethyl phosphite could, if desired, be removed by known methods.

Instead of elemental halogens, other known halogenating agents, such as thionyl chloride, sulfuryl chloride, N-chlorosuccinimide and N,N-dichlorophenylsulfonamide, employed in the processes of the preceding examples, also result in desired phosphoryl compounds being made.

Example 9

A vessel was charged with 480 parts of methanol and was cooled to 0–10 degrees centigrade. Chlorine gas and trimethyl phosphite (62.0 parts) were then run in simultaneously, at such a rate that the chlorine was always in slight excess as indicated by the yellowish green color of the solution. The reaction temperature was maintained between 0 degree centigrade and 10 degrees centigrade by external cooling. At the end of the addition, which required 20–25 minutes, the solution was allowed to warm to room temperature and was then stripped on a steam bath maintained at about 100–110 degrees centigrade under water pump vacuum. The product, a colorless liquid (62.7 parts, $n_d^{21}$ 1.4058) gave on distillation 36.1 parts (52% yield) of trimethyl phosphate, boiling point 70–74 degrees centigrade/10 mm., $n_d^{25}$ 1.3940, uncontaminated by dimethyl methylphosphonate.

This example illustrates a preferred mode of operation of the present invention, as it suppresses the formation of dimethyl methylphosphonate giving products which are substantially free thereof.

Example 10

Trimethyl phosphate was prepared according to the procedure of Example 9, the only modification being stripping from a warm water bath maintained at about 40–50 degrees centigrade instead of a steam bath. The yield of trimethyl phosphate, boiling point 75–80 degrees centigrade/10 mm. $n_d^{20}$ 1.3963, $d_4^{20}$ 1.2127, was 88 percent. This illustrates a sensitivity of the methyl ester to the stripping conditions which was not apparent with other esters.

An examination of the product showed that it was exceptionally pure trimethyl phosphate. It contained no dimethyl methylphosphonate, or other such material detectable by gas chromatography. Acidity: 0.3 mg. KOH per gram.

Analysis.—Calculated for $C_3H_9O_4P$: P, 22.1; Cl, nil. Found: P, 22.5; Cl, 0.01.

Example 11

Triethyl phosphate, boiling point 86–88 degrees centigrade/8 mm., $n_d^{20}$ 1.4052, $d_4^{20}$ 1.0703, was prepared in 91 percent yield following the procedure set forth in Example 9 but using 49.8 parts of triethyl phosphite and 412 parts of anhydrous ethanol. The product contained no triethyl phosphite, diethyl phosphite or diethyl ethylphosphonate. Acidity, 1.1 mg. KOH per gram. Gas chromatography showed only 0.2 percent volatile impurity.

Analysis.—Calculated for $C_6H_{15}O_4P$: P, 17.0; Cl, nil. Found: P, 16.3; Cl, <0.02.

Example 12

Following Example 9 but using 41.6 parts of tripropyl phosphite and 360 parts of n-propanol, and adding the phosphite and halogen to the alcohol over a period of 12 minutes, tripropyl phosphate was prepared in 100 percent yield. The boiling point of the product was 86–88 degrees centigrade at 1.25 mm., $n_d^{20}$ 1.4173, and $d_4^{20}$ 1.0115.

Analysis.—Calculated for $C_9H_{21}O_4P$: P, 13.8; Cl, nil. Found: P, 13.0; Cl, 0.8.

Volatile impurities measured by gas chromatography amounted to 1.2 percent; acidity, 1.9 mg. KOH per gram.

Example 13

Tributyl phosphate, boiling point 148–150 degrees centigrade/9 mm., $n_d^{20}$ 1.4246, $d_4^{20}$ 0.9771, was prepared in 50 percent yield from 50.0 parts of tributyl phosphite and 444 parts of n-butanol, following the procedure of Example 9 and utilizing about 0.31 mole of chlorine.

Analysis.—Calculated for $C_{12}H_{27}O_4P$: P, 11.6; Cl, nil. Found: P, 11.1; Cl, nil.

The product contained no tributyl phosphite, 0.1 percent dibutyl phosphite, and 1.1% volatile impurities detected by gas chromatography. The acidity was 0.5 mg. KOH per gram.

Example 14

The procedure of Example 9 was repeated to prepare triisobutyl phosphate, boiling point 90–92 degrees centigrade/0.75 mm., $n_d^{20}$ 1.4192, $d_4^{20}$ 0.9661 in 99 percent yield, using 50.0 parts of triisobutyl phosphite and 444 parts of isobutanol. The addition was carried out over a period of about 35 minutes and the product contained no impurities detectable by gas chromatography.

*Analysis.*—Calculated for $C_{12}H_{27}O_4P$: P, 11.6; Cl, nil. Found: P, 11.7; Cl, 0.2.

Example 15

Tris(2-chloroethyl)phosphate having a boiling point of 146 degrees centigrade at 1 mm., $n_d^{20}$ 1.4734, $d_4^{20}$ 1.420, was prepared in 96 percent yield following the procedure of Example 9 and using 53.9 parts of tris(2-chloroethyl) phosphite and 483 parts of ethylene chlorohydrin.

*Analysis.*—Calculated for $C_6H_{12}Cl_3O_4P$: P, 10.9; Cl, 37.3. Found: P, 10.8; Cl, 37.3.

The product contained no tris(2-chloroethyl)phosphite or bis(2-chloroethyl)phosphite, but gas chromatography revealed the presence of 6.0 percent impurities and the acidity was 2.3 milligrams KOH per gram.

Example 16

Tris(2-ethylhexyl)phosphate, $n_d^{25}$ 1.4436, was prepared in 93 percent yield from 83.6 parts of tris(2-ethylhexyl) phosphite and 780 parts of 2-ethylhexanol, following the procedure outlined in Example 9. The product, isolated as an undistilled residue, contained no tris(2-ethylhexyl) phosphite but about 0.5 percent of bis(2-ethylhexyl)phosphite. The acidity of the product was 0.8 milligram of KOH per gram of product.

*Analysis.*—Calculated for $C_{24}H_{51}O_4P$: P, 7.1; Cl, nil. Found: P, 6.3; Cl, 0.16.

Example 17

Tris(2-phenethyl)phosphate ($n_d^{26}$ 1.5508) was prepared in quantitative yield using 19.7 parts of tris(2-phenethyl)-phosphite and 122.0 parts of phenethyl alcohol, following the procedure of Example 9. The product was isolated as the undistilled residue. Analysis showed the following:

*Analysis.*—Calculated for $C_{24}H_{27}O_4P$: P, 7.6; Cl, nil. Found: P, 6.4; Cl, 0.28.

Acidity was 2.2 ml 0.1 N NaOH per gram of product.

Example 18

Chlorine was passed into a slurry of 25.1 parts of tristearyl phosphite and 40.5 parts of stearyl alcohol in 220 parts of benzene at 25–30 degrees centigrade, the reaction temperature being maintained by external cooling. The resulting mixture was filtered, stripped of volatiles under vacuum, slurried in acetone, filtered and dried, giving 31.1 parts of product, melting point 55.5–57.5 degrees centigrade after recrystallization from either ethanol or acetone. The product was identified by infrared and gas chromatographic analysis and showed tristearyl phosphate admixed with 31–33 percent of stearyl alcohol. The remaining stearyl alcohol was removed by vacuum distillation.

Example 19

This example and the three which follow illustrate the use of halogenating agents other than chlorine.

At a temperature of 0–10 degrees centigrade, trimethyl phosphite was added for about 15 minutes to a solution of 25.4 parts of iodine in an excess of methanol (500 milliliters) until the solution was decolorized. This required 13.0 parts of trimethyl phosphite (theor. 12.4 parts). The solution was then stripped over a steam bath utilizing water pump vacuum, giving a residue (13.4 parts). This residue was shown by analysis to contain no trimethyl phosphite but 1.5 percent dimethyl phosphite. Distillation of the residue gave 8.4 parts (60 percent yield) of trimethyl phosphate. The trimethyl phosphate product had a boiling point of 80–87 degrees centigrade/ 10 mm. mercury, $n_d^{22}$ 1.3950–1.3956.

*Analysis.*—Calculated for $C_3H_9O_4P$: P, 22.1. Found: P, 23.0.

Example 20

At a temperature of 0–10 degrees centigrade, trimethyl phosphite (62.0 parts) and thionyl chloride (59.5 parts) were added separately and simultaneously to 480 parts of methanol, at such a rate that the temperature did not exceed 10 degrees centigrade. An iodine test on the resulting solution showed that the phosphite was all consumed. Distillation gave a product which was shown by infrared and other analyses to be a mixture of dimethyl phosphite and trimethyl phosphate.

Example 21

At a temperature of 0–10 degrees centigrade tributyl phosphite (50.0 parts) and sulfuryl chloride (27.0 parts) were added separately and simultaneously to 444 parts of butanol, at such a rate that the temperature did not exceed 10 degrees centigrade. A test on the resulting solution for unreacted phosphite was negative. The solution was then stripped of volatiles on a steam bath under water pump vacuum leaving a product (73.3 parts), which was shown by gas chromatography to consist of tributyl phosphate (30.8 percent) and other components. Distillation of this product gave 12.4 parts (23 percent yield) of tributyl phosphate which had a boiling point of 119–126 degrees centigrade at 1.4 mm. and $n_d^{25}$ 1.4218.

Analysis for phosphorus and chlorine was as follows—

Calculated for $C_{12}H_{27}O_4P$: 11.6; Cl, nil. Found; P, 10.7; Cl, nil.

Example 22

Triethyl phosphite (49.8 parts) was added to a slurry of anhydrous cupric chloride (80.7 parts) in ethanol (414 parts) at 0–10 degrees centigrade until the brown color was discharged. The product was stripped on a steam bath under water pump vacuum and then slurried with petroleum ether, filtered and again stripped. Distillation gave 24.4 parts of liquid, having a boiling point of about 58–62 degrees centigrade/0.5 mm. of mercury and $n_d^{24}$ 1.4048. These analyses are consistent with a product which contains triethyl phosphate with 15.9 percent of diethyl phosphite present.

Example 23

This example and the example following illustrate the use of trialkyl phosphites and alcohols containing unlike radicals in the practice of this invention.

Following the procedure of Example 9, trimethyl phosphite (62.0 parts) and chlorine were added simultaneously to 900 parts of propanol at 0–10 degrees centigrade. Subsequent work-up gave a product having a boiling point of between 135 and 139 degrees centigrade at 15 mm. of mercury, and $n_d^{23}$ 1.4150, $d_4^{20}$ 1.0349, identified by analysis and infrared as tripropyl phosphate. The yield was 52 percent.

*Analysis.*—Calculated for $C_9H_{21}O_4P$: P, 13.8; Cl, nil. Found: P, 13.7; Cl, 0.07.

Example 24

Following the procedure of Example 9, tripropyl phosphite (41.6 parts) and chlorine were added simultaneously to 192 parts of methanol at 0–10 degrees centigrade. The product (39.6 parts) was a trialkyl phosphate containing a mixture of methyl and propyl groups. Fractional distillation gave a series of products, one of which had a boiling point of 72–78 degrees centigrade at 1.7–0.4 mm. of mercury, $n_d^{25}$ 1.4122, which is consistent with an identification of the product as methyl dipropyl phosphate (16 percent yield).

*Analysis.*—Calculated for $C_7H_{17}O_4P$: P, 15.8. Found: P. 15.7.

From this example and Example 23 it is seen that alcohols and trialkyl phosphites containing different radicals may be used in the practice of this invention to make trialkyl phosphates with either like radicals or unlike radicals.

Example 25

Dibutyl phosphite (38.8 parts) and chlorine were added simultaneously to 444 parts of butanol at 0–10 degrees centigrade following the procedure of Example 9. The product was found to still contain unreacted phosphite, so the addition of chlorine was resumed and continued at 25–30 degrees centigrade until the phosphite was all consumed. The solution was then stripped on a steam bath under full water pump vacuum and distilled, giving 25.7 parts (76 percent yield) of tributyl phosphate, having a boiling point of 95–98 degrees centigrade at 0.3 mm. of mercury and $n_d^{25}$ 1.4232.

*Analysis.*—Calculated for $C_{12}H_{27}O_4P$: P, 11.7. Found: P, 10.7.

Following this example other dialkyl phosphites, such as dimethyl, diethyl, dipropyl, distearyl or bis(2-chloroethyl)phosphite may be reacted in a similar manner to form a trialkyl phosphate.

Example 26

Phosphorus trichloride (137.5 parts) and chlorine were added separately and simultaneously for about one hour to 960 parts of methanol at −20° centigrade to −10° centigrade at such a rate that the temperature did not exceed −10 degrees centigrade. When the chlorine color was no longer discharged, the solution was stirred 1 hour at −20 degrees centigrade to −10° centigrade, and then stripped under the mildest conditions possible. The residue (136.4 parts) was distilled, giving 88.9 parts (64 percent yield) of trimethyl phosphate, having a boiling point of 72–105 degrees centigrade at 9 mm., $$n_d^{25}\ 1.3948{-}1.3956$$

The product was free of dimethyl phosphite or dimethyl methylphosphonate.

*Analysis.*—Calculated for $C_3H_9O_4P$: P, 22.1. Found: P, 22.3.

Example 27

Triethyl phosphate, having a boiling point of 84–85 degrees centigrade at 5 mm., $n_d^{20}$ 1.4058, $d_4^{20}$ 1.070, was prepared in 89 percent yield from 45.8 parts of phosphorus trichloride and 414 parts of ethanol. The procedure of Example 26 was followed, except that the phosphorus trichloride was passed in under the surface. The product was found to be exceptionally pure triethyl phosphate. Analysis showed 99 percent pure by gas chromatography, acidity 1.1 mg. KOH per gram. There was no diethyl phosphite, triethyl phosphite or diethyl ethylphosphonate present.

From this example and the foregoing examples it is seen that organophosphorus compounds of character intermediate between the trialkyl phosphite, $(R'O)_3P$, and phosphorus trichloride, $PCl_3$, may be used in the practice of this invention. Such compounds are the alkyl phosphorodichloridites, $ROPCl_2$, and the dialkyl phosphorochloridites, $(R'O)_2PCl$, where R' is defined as above. For example, either ethyl phosphorodichloridite or diethyl phosphorochloridite could be employed in conjunction with chlorine and ethanol to form triethyl phosphate.

Example 28

A stream of chlorine diluted with nitrogen in a ratio of 2:3 was passed into a slurry of 6.2 parts of white phosphorus in 276 parts of ethanol as 45–50 degrees centigrade until the phosphorus was all consumed (about 5 hours). The solution was then purged with nitrogen and stripped on a steam bath under reduced pressure, giving 51.5 parts of triethyl phosphate, $n_d^{23}$ 1.4058. This product was distilled, giving an 85 percent yield of pure triethyl phosphate having a boiling point of 69 degrees centigrade at 1–2 mm. of mercury, $n_d^{23}$ 1.4048, uncontaminated by diethyl ethylphosphonate.

*Analysis.*—Calculated for $C_6H_{15}O_4P$: P, 17.0. Found: P, 16.9.

Example 29

The use of red phosphorus in place of white phosphorus in Example 28 and 1.70 moles of chlorine gave a 100 percent yield of triethyl phosphate having a boiling point of 58–60 degrees centigrade at 0.5 mm. of mercury, $n_d^{24}$ 1.4090.

Examples 30–32

The effect of varying the reaction temperature on the yield of triethyl phosphate in the reaction of elemental phosphorus, ethanol and chlorine is illustrated in Table II. In the first two experiments, where the reaction temperature was below the melting point of white phosphorus, the phosphorus and alcohol mixture was first warmed to 50 degrees centigrade, dispersed with a high-speed stirrer, and cooled to the required temperature with continuous stirring. The experiments were otherwise conducted under the condition set forth in Example 28.

TABLE II

| Example | Reaction temperature, ° Centigrade | $(C_2H_5O)_3PO$, Percent yield |
|---|---|---|
| 30 | −10 to 0 | 43 |
| 31 | 25 to 30 | 66 |
| 28 | 45 to 50 | 85 |
| 32 | [1] 78 | 46 |

[1] Reflux.

The triethyl phosphite produced in each example was of good quality; the product of Example 30 had a boiling point of 66° C. at 2 mm. of mercury, $n_d^{23}$ 1.4050, and assayed 99.7 percent pure by gas chromatography.

Example 33

The use of 95 percent ethanol in an experiment conducted in accordance with Example 28 gave triethyl phosphate in 67 percent yield. 2.72 moles of chlorine were utilized in this experiment. This experiment illustrates that small amounts of water in the reaction mixture are tolerable.

Example 34

An experiment similar to Example 28 was conducted in which the reaction pressure was adjusted to 200 mm. so that the ethanol would reflux at 50° C. Triethyl phosphate was formed in 88 percent yield. 1.56 moles of chlorine were utilized in this example.

Example 35

Following the procedure set forth in Example 28, trimethyl phosphate was prepared from 12.4 parts of white phosphorus, 384 parts of methanol and 117 parts of chlorine reacted over a period of five and a half hours. The product had a boiling point of 51–52° C./2 mm., $n_d^{24}$ 1.3956, and was obtained in yields varying from 34 percent to 61 percent:

*Analysis.*—Calculated for $C_3H_9O_4P$: P, 22.1. Found: P, 22.1.

Example 36

Tributyl phosphate, boiling point 88–90° C./0.005 mm., $n_d^{24}$ 1.4238, was prepared in 100 percent yield from 6.2 parts of white phosphorus and 445 parts of butanol, following the procedure of Example 28, except 41 parts of chlorine were added over a period of four hours.

Example 37

Tris(2-ethylhexyl)phosphate, $n_d^{25}$ 1.4443, was prepared in 100 percent yield as an undistilled, pale yellow liquid by applying the procedure of Example 28 to 6.2 parts of white phosphorus and 390.6 parts of 2-ethylhexanol. Tests on the product for dialkyl or trialkyl phosphite and acidity were negative.

*Analysis.*—Calculated for $C_{24}H_{51}O_4P$: P, 7.1; Cl, nil. Found: P, 6.3; Cl, 1.3.

Example 38

A stream of chlorine (0.48 mole) diluted with nitrogen was passed into a slurry of 3.1 parts of white phosphorus, 361 parts of HET® Diol (1,4,5,6,7,7-hexachloro-2,3-dimethylol bicyclo-[2.2.1]-2,5-heptadiene) and 25 parts of benzene at 45–50° C. until the phosphorus was all consumed. The mixture was then purged with nitrogen, filtered and stripped of volatiles under reduced pressure. The residue, a dark, viscous, semi-solid mass, was taken up in ethanol, filtered and again concentrated. The solids obtained in both operations were identified as HET-ether (1,4,5,6,7,7 - hexachloro - 2,3 - oxydimethylene bicyclo-[2.2.1]-2,5-heptadiene) melting point 193–199° C. after recrystallization from ethanol. This ether represented the alkyl halide by-product of this reaction, as the ether is known to be readily found from the hydroxy chloride.

The product obtained from the ethanol filtrate was black, (37.8 parts). Analysis showed the following (calculating values corresponding to a neutral phosphate based on a 3:2 ratio of HET Diol to phosphorus):

*Analysis.*—Calculated for $C_{27}H_{18}Cl_{18}O_8P_2$: P, 5.3; Cl, 54.6. Found: P, 4.7; Cl, 46.5 (total), 4.2 (active).

This example shows that hydroxyl compounds containing two or more hydroxyl groups may be used in the practice of this invention.

Example 39

A stream of chlorine diluted with nitrogen in about a 3:2 ratio was passed into a slurry of one part of white phosphorus and 64.8 parts of stearyl alcohol in 220 parts of benzene at 45–50 C. until a test for unreacted phosphorus was negative. The mixture was then filtered, stripped of volatiles under vacuum, slurried in acetone, filtered and dried, giving 35.7 parts of product, melting point 55.5–57° C. after recrystallization from ethanol. The product was identified as tristearyl phosphate admixed with 44–48 percent of stearyl alcohol. It was very similar in properties to the product of Example 18.

Example 40

Diethyl phenylphosphonite (19.8 parts) and chlorine for a period of 12 minutes were added separately and simultaneously to 138 parts of anhydrous ethanol at 0–10° C. at such a rate that the chlorine was always in slight excess. When the chlorine color was no longer discharged, the solution was purged with nitrogen, allowed to warm to room temperature and then stripped carefully under vacuum. The residue was distilled, giving 13.0 parts (61 percent yield) of diethyl phenylphosphonate, boiling point 118–121° C./1.4 mm., $n_d^{23}$ 1.4964; acidity, 0.68 ml. 0.1 N NaOH per g.

*Analysis.*—Calculated for $C_{10}H_{15}O_3P$: P, 14.5; Cl, nil. Found: P, 13.8; Cl, 1.3 (total), 0.08 (active).

From this example and Examples 26 and 27, in which the phosphorus compound employed was phosphorus trichloride, it is evident that the phosphonous dichlorides, $RPCl_2$, and the alkyl phosphonochloridites, $RP(OR')Cl$, may be used in the practice of this invention to prepare phosphonates; and from Example 25, in which a dialkyl phosphite was employed, that a higher organophosphorus counterpart such as an alkyl hydrogen phosphonite $(RP(OR')OH \rightleftarrows RPH(O)OR')$ could be used as the phosphorus-containing reagent. In these substances R and R' are defined as above.

Example 41

Chlorine was passed into a solution of 6.6 parts of ethyl diphenylphosphinite in 39.6 parts of anhydrous ethanol at 0–10° C. until the chlorine color became permanent (after about 5 minutes). The solution was then purged with nitrogen, allowed to warm to room temperature and then stripped carefully under vacuum. The residue was distilled, giving 6.1 parts (87 percent yield) of ethyl diphenylphosphinate, having a boiling point of 160° centigrade at 0.4 mm. mercury (absolute), a melting point of 39–41° centigrade and acidity of 1.27 ml. 0.1 N NaOH per g. of product.

*Analysis.*—Calculated for $C_{14}H_{15}O_2P$: P, 12.6; Cl, nil. Found: P, 12.6; Cl, 0.4 (total), 0.08 (active).

From this example and Examples 26 and 27 in which the phosphorus-containing reagent was phosphorus trichloride, it is seen that the phosphinous chlorides, $R_2PCl$, may be used in the practice of this invention; and from Example 25, in which a dialkyl phosphite was employed, that a phosphinous acid, $R_2POH$ (more commonly written as a phosphine oxide, $R_2P(O)H$), may be employed, the product in both instances being an ester of phosphinic acid, as in the present example.

Example 42

Chlorine (0.21 mole) was passed into a slurry of 26.2 parts of triphenylphosphine in 138 parts of anhydrous ethanol at 25–35° centigrade until the color became permanent. The product was then stripped under reduced pressure, leaving a white solid which melted at 155.5–157° centigrade after washing with 1:1 hexane/benzene. The product was identified by its infrared spectrum as triphenylphosphine oxide.

What is claimed is:

1. A process consisting essentially of reacting (a) a halogenating agent selected from the group consisting of chlorine, bromine, iodine, sulfuryl chloride, thionyl chloride, N-chlorosuccinimide, N,N-dichlorophenyl sulfonamide, and cupric chloride, (b) an alcohol selected from the group consisting of anhydrous monohydric alcohol and a glycol, and (c) a member selected from the group consisting of (1) elemental phosphorus and (2) a phosphorus-containing compound of the formula:

$$(R^3)_{n'}P(OR^2)_{n^2}$$

in which $n'$ is an integer of zero to 3 and $n^2$ is an integer of zero to 3, provided that $n'$ plus $n^2$ equals three, in which $R^3$ is selected from the group consisting of chlorine, bromine, iodine, alkyl, and phenylalkyl, and in which $R^2$ is selected from the group consisting of hydrogen, alkyl, and phenylalkyl, said reacting being sufficient to produce a product comprising a phosphorus compound containing a phosphoryl group.

2. A process according to claim 1, in which $n'$ is 1 and $n^2$ is 2, and in which said phosphorus compound containing said phosphoryl group has the formula:

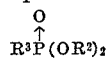

3. A process according to claim 1, in which $n'$ is zero and $n^2$ is 3, and in which said phosphorus compound containing said phosphoryl group has the formula:

4. A process according to claim 1, in which $n'$ is 2 and $n^2$ is one, and in which said phosphorus compound containing said phosphoryl group has the formula:

5. A process according to claim 1, in which $n'$ is 3 and $n^2$ is zero, and in which said phosphorus compound containing said phosphoryl group has the formula:

6. A process according to claim 1, including recovering said phosphorus compound containing said phosphoryl group.

7. A process according to claim 1, in which said glycol is selected from the group consisting of ethylene glycol, propylene glycol, and chlorendic diol.

8. A process according to claim 1 wherein the halogenating agent is chlorine.

9. A process according to claim 1, in which said member is phosphorus.

10. A process according to claim 9 wherein the halogenating agent is chlorine.

11. A process according to claim 10 wherein the monohydric alcohol is a lower alkanol.

References Cited

UNITED STATES PATENTS

| | | | |
|---|---|---|---|
| 2,078,421 | 4/1937 | Shuman | 260—985 X |
| 3,104,254 | 9/1963 | Reetz | 260—985 X |

FOREIGN PATENTS 1,103,328  3/1961  Germany.

OTHER REFERENCES

Cadogen et al.: J. Chem. Soc. (London) (1961), pp. 3079–3082.

CHARLES B. PARKER, *Primary Examiner.*

F. M. SIKORA, A. H. SUTTO, *Examiners.*

UNITED STATES PATENT OFFICE
CERTIFICATE OF CORRECTION

Patent No. 3,340,333                                 September 5, 1967

Charles F. Baranauckas et al.

It is certified that error appears in the above identified patent and that said Letters Patent are hereby corrected as shown below:

Column 3, line 14, "tri-(3-acetoxypropyl) phosphite, dibutyl butyl phosphonite" should read -- tripropenyl phosphite, tri-(2-methylpropenyl) phosphite, --. Column 4, line 73, "trimethyle" should read -- trimethyl --. Column 5, line 29, "indcate" should read -- indicate --. Column 11, line 31, "45-50C." should read -- 45-50°C. --. Column 12, line 34, the formula should appear as shown below:

$$(R^3)_n \cdot P(OR^2)_{n2}$$

Signed and sealed this 10th day of March 1970.

(SEAL)
Attest:

Edward M. Fletcher, Jr.                                WILLIAM E. SCHUYLER, JR.
Attesting Officer                                                Commissioner of Patents